US011255219B2

(12) United States Patent
Schleif et al.

(10) Patent No.: US 11,255,219 B2
(45) Date of Patent: Feb. 22, 2022

(54) SYSTEM AND METHOD FOR TURBOMACHINERY BLADE DIAGNOSTICS VIA DISCRETE MARKINGS

(71) Applicant: General Electric Company, Schenectady, NY (US)

(72) Inventors: Kurt Kramer Schleif, Greenville, SC (US); Michael Allen Ball, Greenville, SC (US)

(73) Assignee: General Electric Company, Schenectady, NY (US)

(*) Notice: Subject to any disclaimer, the term of this patent is extended or adjusted under 35 U.S.C. 154(b) by 202 days.

(21) Appl. No.: 16/005,588

(22) Filed: Jun. 11, 2018

(65) Prior Publication Data
US 2019/0376410 A1    Dec. 12, 2019

(51) Int. Cl.
*F01D 21/00* (2006.01)
*F02C 9/00* (2006.01)
*G07C 3/00* (2006.01)

(52) U.S. Cl.
CPC .............. *F01D 21/003* (2013.01); *F02C 9/00* (2013.01); *G07C 3/00* (2013.01); *F05D 2260/80* (2013.01); *F05D 2270/821* (2013.01)

(58) Field of Classification Search
None
See application file for complete search history.

(56) References Cited

U.S. PATENT DOCUMENTS

| 4,060,329 | A  | * | 11/1977 | Ellis ....................... G01B 11/16 356/614 |
| 9,829,005 | B2 | * | 11/2017 | Jactat .................. F04D 29/4206 |
| 2004/0148793 | A1 | * | 8/2004 | Holder .................... F01D 5/005 33/562 |
| 2004/0162374 | A1 | * | 8/2004 | Watson .................. G01K 13/08 524/409 |
| 2005/0270519 | A1 | * | 12/2005 | Twerdochlib ........... G01P 3/488 356/24 |
| 2007/0132461 | A1 | * | 6/2007 | Holmquist .............. F01D 17/02 324/644 |
| 2007/0175032 | A1 | * | 8/2007 | Kurt-Elli ................... F01D 5/16 29/889.21 |
| 2008/0088824 | A1 | * | 4/2008 | McMillan ............. F01D 21/003 356/51 |
| 2012/0285226 | A1 | * | 11/2012 | Laurer ...................... F01D 5/12 73/86 |
| 2013/0321824 | A1 | * | 12/2013 | Hockaday ............. G01L 5/0061 356/614 |
| 2014/0000380 | A1 | * | 1/2014 | Slowik .................. F01D 21/003 73/800 |

(Continued)

FOREIGN PATENT DOCUMENTS

GB    2482468 A  *  2/2012  ............ G01B 7/023

*Primary Examiner* — Lina M Cordero
(74) *Attorney, Agent, or Firm* — Fletcher Yoder P.C.

(57) ABSTRACT

Systems and methods include a blade monitoring system. The blade monitoring system includes a processor. The processor is configured to receive a sensor signal from a sensor configured to observe a blade of the turbomachinery. The processor is also configured to derive a measurement based on a marking disposed on the blade of the turbomachinery, wherein the marking comprises a discrete feature; and to display the measurement to an operator of the turbomachinery

16 Claims, 9 Drawing Sheets

(56) References Cited

U.S. PATENT DOCUMENTS

| | | | | |
|---|---|---|---|---|
| 2014/0355007 A1* | 12/2014 | Jousselin | ............... | G01B 11/26 |
| | | | | 356/614 |
| 2016/0115816 A1* | 4/2016 | Webb | ..................... | F01D 5/284 |
| | | | | 416/189 |
| 2017/0131138 A1* | 5/2017 | Talon | ........................ | F01D 9/02 |
| 2018/0238342 A1* | 8/2018 | Kalochairetis | ............ | F02K 3/06 |
| 2018/0274385 A1* | 9/2018 | Seely | .................... | G01H 13/00 |

* cited by examiner

US 11,255,219 B2

SYSTEM AND METHOD FOR TURBOMACHINERY BLADE DIAGNOSTICS VIA DISCRETE MARKINGS

BACKGROUND

The subject matter disclosed herein relates to turbomachinery, and more specifically, to a system and method for turbomachinery blade prognostics and diagnostics via discrete markings.

Certain turbomachinery, such as gas turbine systems, generally include a compressor, a combustor, and a turbine. The compressor compresses air from an air intake, and subsequently directs the compressed air to the combustor. In the combustor, the compressed air received from the compressor is mixed with a fuel and is combusted to create combustion gases. The combustion gases are directed into the turbine. In the turbine, the combustion gases pass across turbine blades of the turbine, thereby driving the turbine blades, and a shaft to which the turbine blades are attached, into rotation. The rotation of the shaft may further drive a load, such as an electrical generator, that is coupled to the shaft. The flow and pressure of the fluids into the turbine may be dependent on the turbine blades. However, components of the gas turbine system may experience wear and tear during use. It would be beneficial to provide prognostic and diagnostic information for the blades of components of the gas turbine system.

BRIEF DESCRIPTION

Certain embodiments commensurate in scope with the present disclosure are summarized below. These embodiments are not intended to limit the scope of the claimed disclosure, but rather these embodiments are intended only to provide a brief summary of possible forms of the disclosure. Indeed, the disclosure may encompass a variety of forms that may be similar to or different from the embodiments set forth below.

In a first embodiment, a blade monitoring system is provided. The blade monitoring system includes a processor. The processor is configured to receive a sensor signal from a sensor configured to observe a blade of the turbomachinery. The processor is also configured to derive a measurement based on a marking disposed on the blade of the turbomachinery, wherein the marking comprises a discrete feature; and to display the measurement to an operator of the turbomachinery.

In a second embodiment, a turbomachinery system is provided. The turbomachinery system includes a blade configured to rotate during operations of the turbomachinery system, and a sensor configured to observe the blade of the turbomachinery. The turbomachinery system also includes a blade monitoring system. The blade monitoring system includes a processor. The processor is configured to receive a sensor signal from a sensor configured to observe a blade of the turbomachinery. The processor is also configured to derive a measurement based on a marking disposed on the blade of the turbomachinery, wherein the marking comprises a discrete feature; and to display the measurement to an operator of the turbomachinery.

In a third embodiment, a method is provided. The method includes receiving, via a processor, a sensor signal from a sensor configured to observe a blade of a turbomachinery. The method also includes deriving, via the processor, a measurement based on a marking disposed on the blade of the turbomachinery, wherein the marking comprises a discrete feature; and displaying the measurement to an operator of the turbomachinery.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
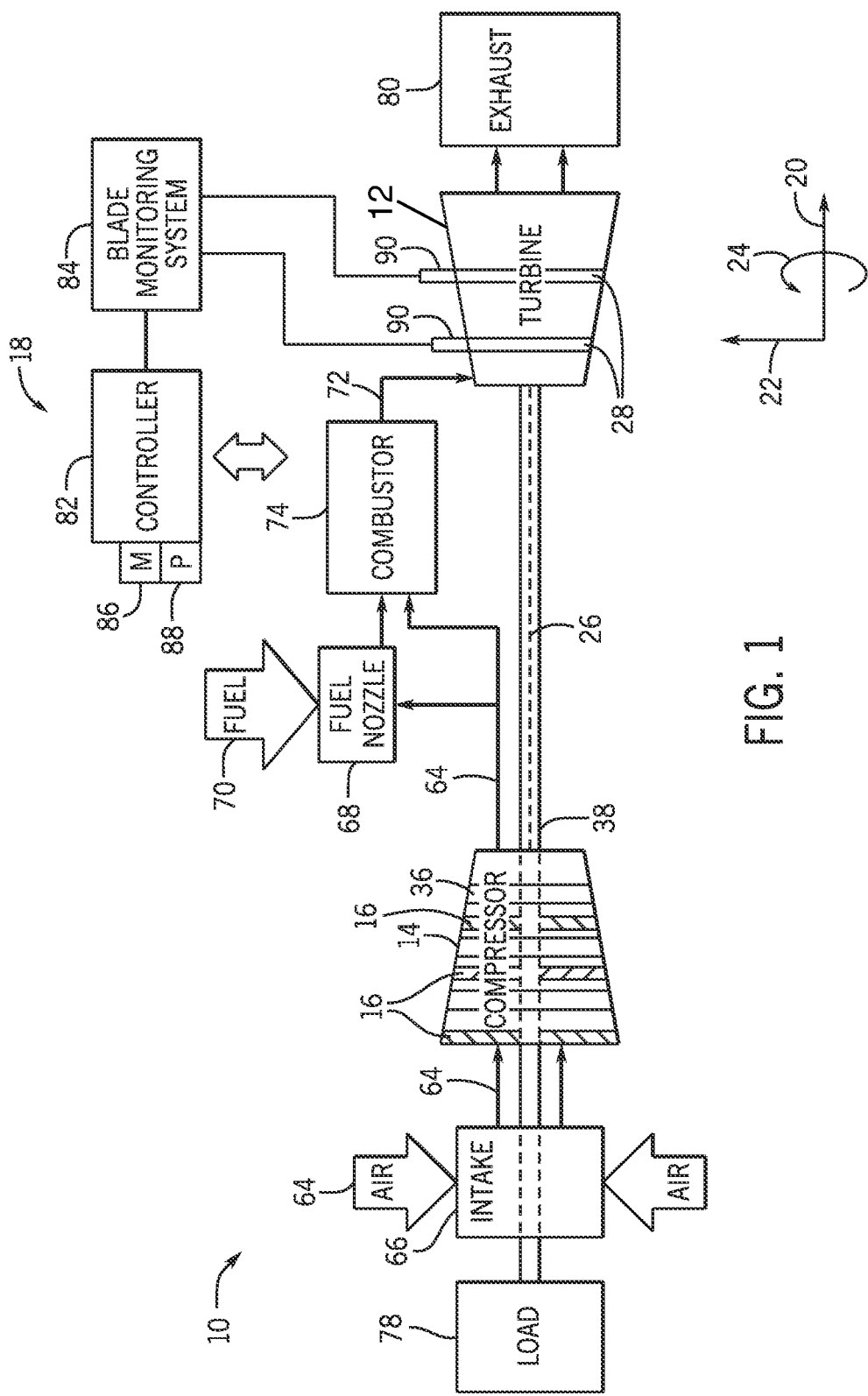
FIG. 1 is a schematic diagram of an embodiment of a gas turbine system having a gas turbine equipped with blades and a blade monitoring system for monitoring of the blades.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

The techniques described herein provide for techniques to "encode" or otherwise mark individual blades in turbomachinery, such as blades in a gas turbine engine, via markings that may be placed on a blade portion (e.g., edge). The markings may include optical markers, magnetic markers, and the like, that may encode which blade the marker is positioned on (e.g., blade 1, blade 2, and so on), as well as include certain shapes suitable for providing other information useful for determining blade properties such as speed, flutter conditions, cracks, and so on. In one embodiment, optical techniques for blade timing measure an intensity of intermittent, reflected light (e.g., reflected from a blade tip or a blade edge) as an array of rotating blades pass through a stationary beam of light. A time domain signal may be analyzed to determine if a rotating blade has arrived "early", "on-time", or "late" relative to a speed signal of, for example, a rotor that carries the blades. To improve the intensity of the reflected light, a paint, a coating, a surface finish, and/or other treatment may be used. The term "paint" is used in the remainder of the application to broadly denote actual paint, coatings, surface finishes, or combinations thereof. Likewise, the term "painting" and/or "painted" is used to broadly denote painting, coating, surface finishing, or a combination thereof.

A location at which the light (e.g., laser light) is interrupted and reflected by a passing blade may change over time, for example due to thermal changes, potentially introducing error in the measurement. To determine where on the passing blade the laser light is being interrupt and reflected, a defined subset of blades of the turbomachinery may be painted with a stripe containing a unique pattern that causes the reflected light to respond differently than on all other blades. The unique pattern can be created by masking a portion (e.g., notch) of the area being painted on the blade surface. A unique feature in the painted pattern on a first blade is positioned at a precise, known location on the surface of the first blade. On a second blade, the unique paint pattern may have the distinguishing feature (e.g., notch) at a different location on the blade surface. The number of blades uniquely marked and/or the number of markings used per blade may be a function of a desired resolution, e.g., a function of how much data to analyze.

When an operator and/or an automated system is monitoring reflected light signal strength, for example, in real-time, the operator and/or the automated system may observe a blade's reflected light intensity as significantly different and distinguishable from the other blades in the array. By knowing which blade is reading different from the others, the operator and/or the automated system may then determine where on the blade the laser light is positioned. The unique patterns of paint on the individual blade surfaces may thus "code" the rotating blades such that the operator and/or the automated system may determine where on the blade surface the laser light is being interrupted and reflected. The patterns may also aid in deriving certain blade properties, such as blade speed, blade flutter, and so on, as further described below.

Turning now to the figures, FIG. 1 illustrates a block diagram of an embodiment of a gas turbine system 10 having a turbine 12 suitable for combusting a carbonaceous fuel to produce rotative power. Also shown is a compressor 14 equipped with vanes 16, and a control system 18. Throughout the discussion, a set of axes will be referenced. These axes are based on a cylindrical coordinate system and point in an axial direction 20, a radial direction 22, and a circumferential direction 24. For example, the axial direction 20 extends along a longitudinal axis 26 of the gas turbine system 10, the radial direction 22 is orthogonal to and extends away from the longitudinal axis 26, and the circumferential direction 24 extends around the longitudinal axis 26. Furthermore, it should be noted that while the present discussion will be focused on turbine blades 28, a variety of rotary equipment, such as compressors 14, pumps, and/or the like, may benefit from the techniques described herein.

An oxidant 64 flows from an intake 66 into the compressor 14, where the rotation of the compressor blades 16 compresses and pressurizes the oxidant 64. The oxidant 64 may include ambient air, pure oxygen, oxygen-enriched air, oxygen-reduced air, oxygen-nitrogen mixtures, or any suitable oxidant that facilitates combustion of fuel. The following discussion refers to air 64 as an example of the oxidant, but is intended only as a non-limiting example. The air 64 flows into a fuel nozzle 68. Within the fuel nozzle 68, fuel 70 mixes with the air 64 at a ratio suitable for combustion, emissions, fuel consumption, power output, and the like. Thereafter, a mixture of the fuel 70 and the air 64 is combusted into hot combustion products 72 within a combustor 74. The hot combustion products 72 enter the turbine 12 and force rotor blades 28 to rotate, thereby driving a shaft 38 into rotation. The rotating shaft 38 provides the energy for the compressor 14 to compress the air 64. More specifically, the rotating shaft 38 rotates the compressor blades 36 attached to the shaft 38 within the compressor 14, thereby pressurizing the air 64 that is fed to the combustor 74. Furthermore, the rotating shaft 38 may drive a load 78, such as an electrical generator or any other device capable of utilizing the mechanical energy of the shaft 38. After the turbine 12 extracts useful work from the combustion products 72, the combustion products 72 are discharged to an exhaust 80.

The control system 18 includes a controller 82 and a blade monitoring system 84. In some embodiments, the blade monitoring system 84 may be included in the controller 82, while in other embodiments the blade monitoring system 84 may be communicatively coupled to the controller 82. The controller 82 may include a memory 86 and one or more processors 88. The processor(s) 88 may be operatively coupled to the memory 86 to execute instructions for carrying out the presently disclosed techniques. These instructions may be encoded in programs or code stored in a tangible non-transitory computer-readable medium, such as the memory 86 and/or other storage. The processor(s) 88 may be a general purpose processor, system-on-chip (SoC) device, or application-specific integrated circuit, or some other processor configuration.

Memory 86 may include a computer readable medium, such as, without limitation, a hard disk drive, a solid state drive, a diskette, a flash drive, a compact disc, a digital video disc, random access memory (RAM), and/or any suitable storage device that enables processor(s) 88 to store, retrieve, and/or execute instructions and/or data. Memory 86 may further include one or more local and/or remote storage devices. Further, the controller 82 may be operably connected to a human machine interface (HMI), a display, and so on, to allow an operator to read measurements, perform analysis, and/or adjust operations of the gas turbine system 10.

In use, the blade monitoring system 84 may detect current properties or conditions of the blades 28 of the turbine 12, for example, by using data from sensors 90. For instance, the sensors 90 may include optical sensor systems and or magnetic sensor systems that sense certain markings disposed on the blades 28, as further described below. The updates from the sensors 90 may be received in real-time, e.g., at a rate between, 1-4,000 microseconds, 1-100 milliseconds. Blade 28 properties or conditions derived by the blade monitoring system 84 may be displayed to an operator and/or provided to the controller 82. The controller 82 may control operations of the gas turbine system 10, for example by controlling fuel flow 70, air flow 64, measuring exhaust 80 temperature, measuring load 78 properties (e.g., electrical power produced), and the like, during operations.

Figure 2:
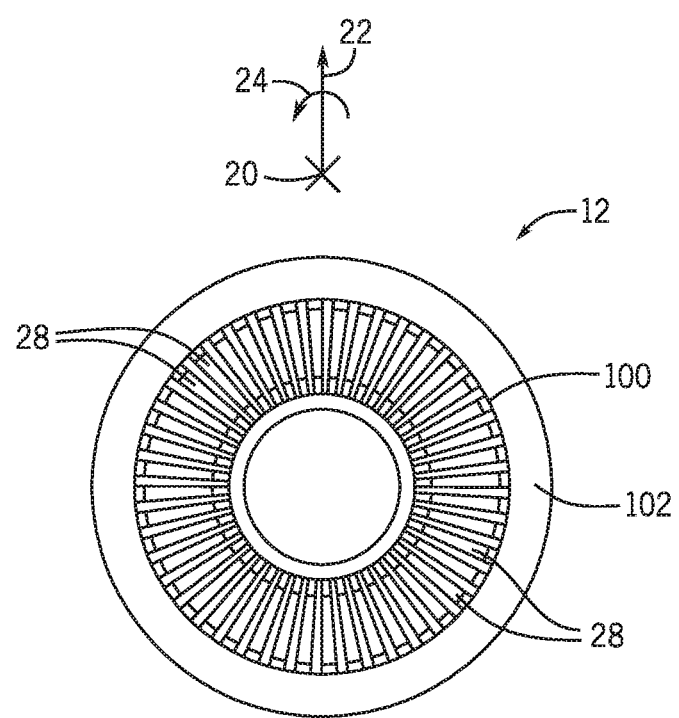
FIG. 2 is a front view of an embodiment of a stage of the gas turbine of FIG. 1, having multiple blades.

FIG. 2 illustrates a front view of an embodiment of a stage 100 of the turbine 12 depicting multiple blades 28. The turbine 12 may include one or more stages 100, each stage 100 having blades 28 suitable for being driven by the fluid product of combustion. Also shown is a stationary casing 102 surrounding the stage 100, as well as other stages not shown. In use, the blades 28 may rotate radially in the circumferential direction 24, thus producing rotative motion that may be converted into power via the load 78, such as an electrical generator. It may be beneficial to sense various properties and characteristics of the stage 100 and blades 28. For example, speed of each blade 28, any deformation (e.g., thermal deformation) in the blades 28, flutter in the blades 28, and so on. Accordingly, the techniques described herein provide for the sensors 90 to be disposed at one or more locations in the stationary casing 102. The sensors 90 may include optical sensors (e.g., laser-based sensors), magnetic sensors, and so on, which may sense certain markings.

Figure 3:
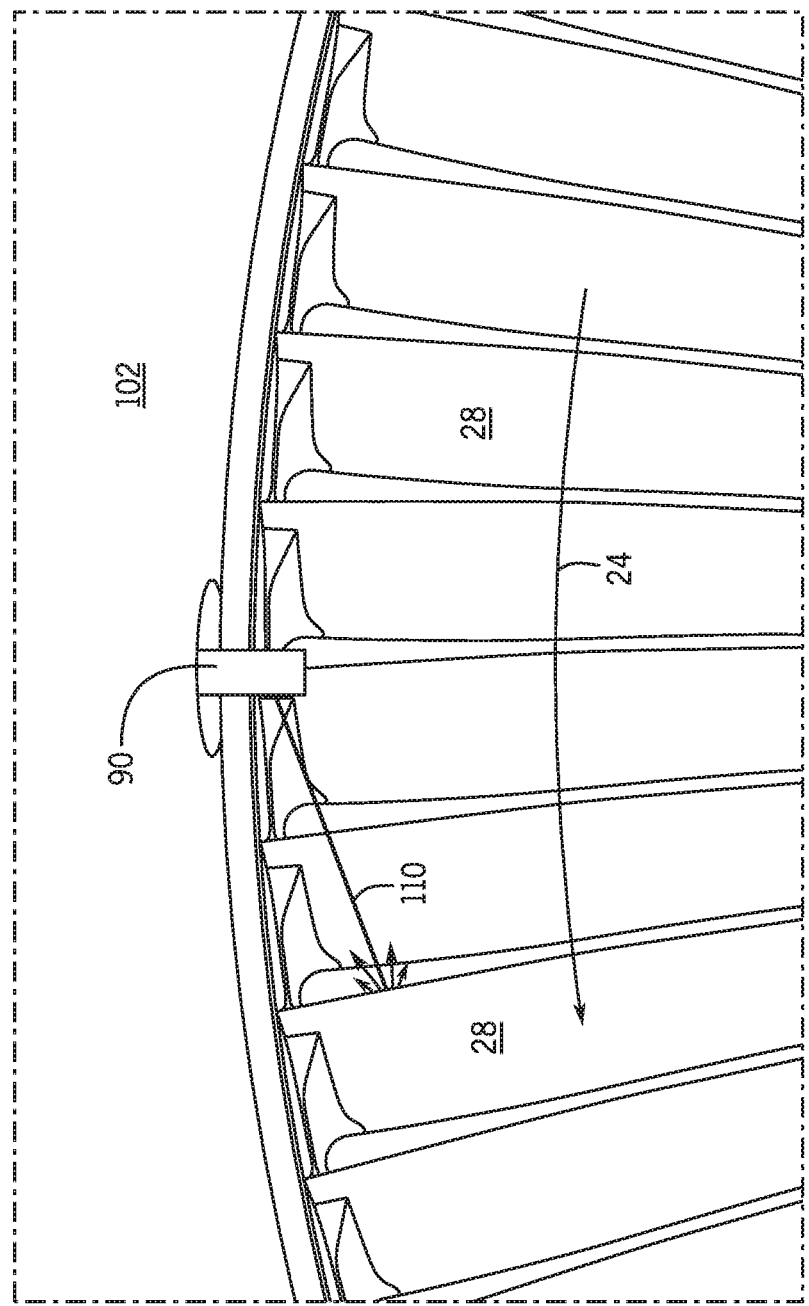
FIG. 3 is a detail front view of an embodiment of a single blade-observing sensor disposed in a stationary casing housing the stage of FIG. 2.

FIG. 3 is a detail front view of an embodiment of a single sensor 90 disposed in the stationary casing 102 and positioned to sense one or more of the blades 28. More specifically, the figure depicts the sensor 90 positioned to observe trailing edges of the blades 28 as they rotate in the circumferential direction 24. In the depicted embodiment, the sensor 90 may be an optical sensor that illuminates the blades 28 with laser light beam 110. The laser light beam 110 is shown as impinging an edge of the blade 28, and then reflecting off the blade 28. Light reflection may then be captured by the sensor 90 and used to derive various properties and conditions of the blade 28. However, during operations, an alignment between the sensor 90 and the blade 28 may shift, for example, because of thermal changes. Accordingly, a point of impact or impingement for the laser light beam 110 may shift, as shown in FIG. 4.

Figure 4:
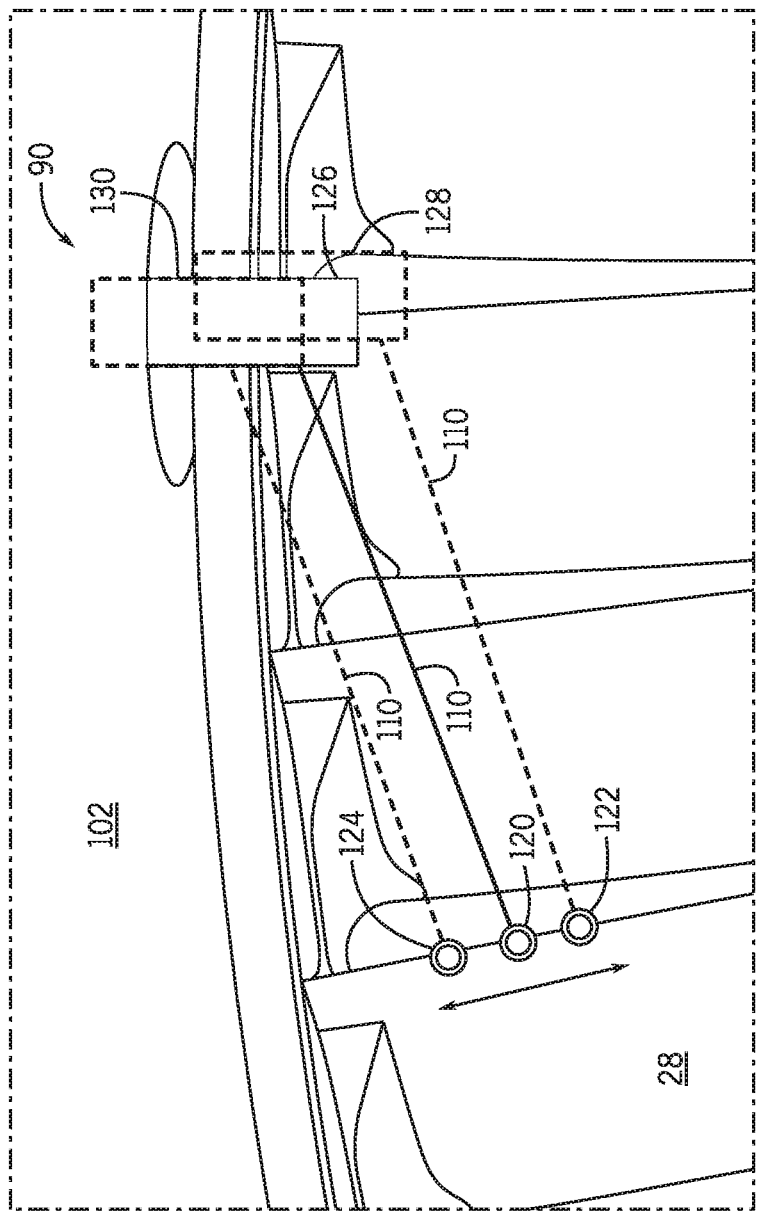
FIG. 4 is a detail front view of an embodiment of the sensor of FIG. 3, showing a shift in sensed points on a blade.

More specifically, FIG. 4 depicts an embodiment of the blade 28 showing three impingement points 120, 122, 124 which may shift during operations of the gas turbine system 10. For example, when the gas turbine system 10 is in a "cold" state, such before startup operations, the point 120 may reflect light incoming from sensor 90 at position 126. As the gas turbine system 10 enters baseload operations, thermal changes, vibration, and so on, may cause the blade 28 and/or the sensor 90 to shift positions with respect to each other. For example, sensor 90 may shift to position 128, which may now cause impingement of light beam 110 at point 122. Likewise, the sensor 90 may shift to position 130, causing impingement of light beam 110 at point 124.

Figure 5:
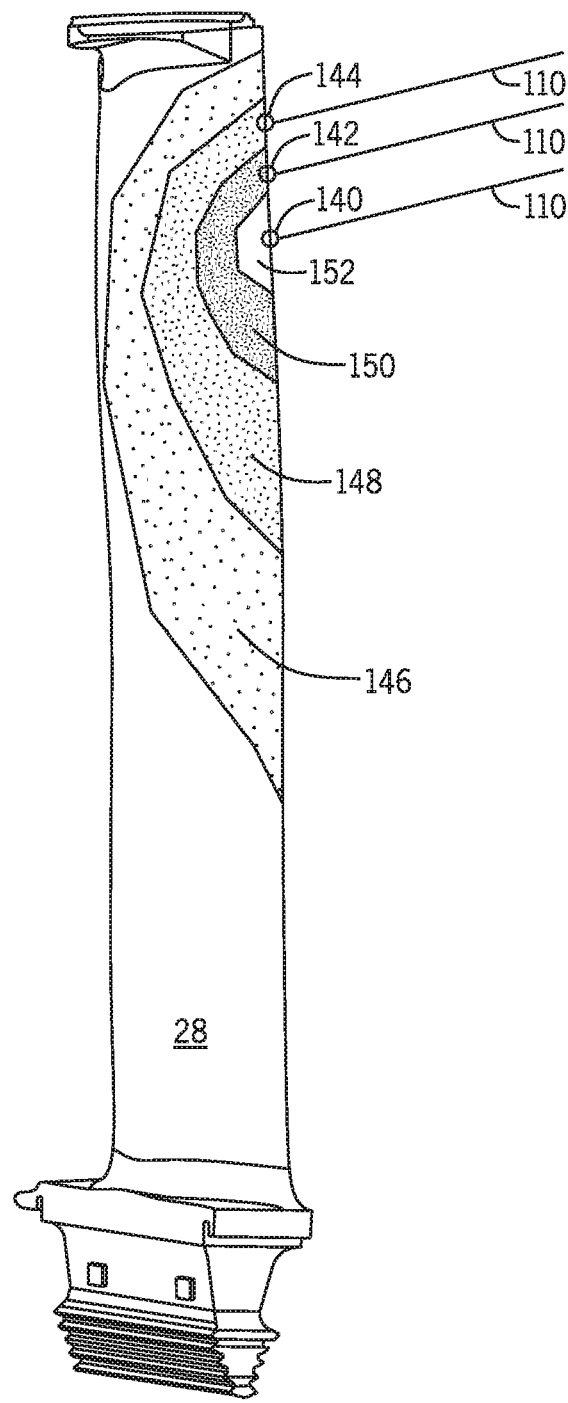
FIG. 5 is a view of an embodiment of a blade of the gas turbine system of FIG. 1 showing a shift in sensed points on the blade.

The shifting of impingement points (e.g., points 120, 122, 124) may lead to inaccuracies in measurement. For example, FIG. 5 illustrates an embodiment of the blade 28 depicting shifting impingement points 140, 142, 144 for the light beam 110. In the depicted embodiment, the blade 28 may be undergoing a condition referred to as blade flutter. During blade flutter, self-excited vibration of blades may typically be caused by the interaction of structural-dynamic and/or aerodynamic forces. For example, blade areas or portions 146, 148, 150 may experience different stresses with respect to each other, which may cause certain areas or portions of the blade 28 to vibrate.

In the depicted embodiment, the sensor 90 may be used to measure displacement of the blade 28. However, because the light beam 110 may now impinge at different locations, it would be beneficial to derive where the light beam 110 is impinging, e.g., radially along direction 24 in real-time. The techniques described herein include the use of certain markings, as further described below, that may be used to determine where the light beam 110 may now be impinging, as well as to provide for derivation of blade 28 properties and conditions.

Figure 6:
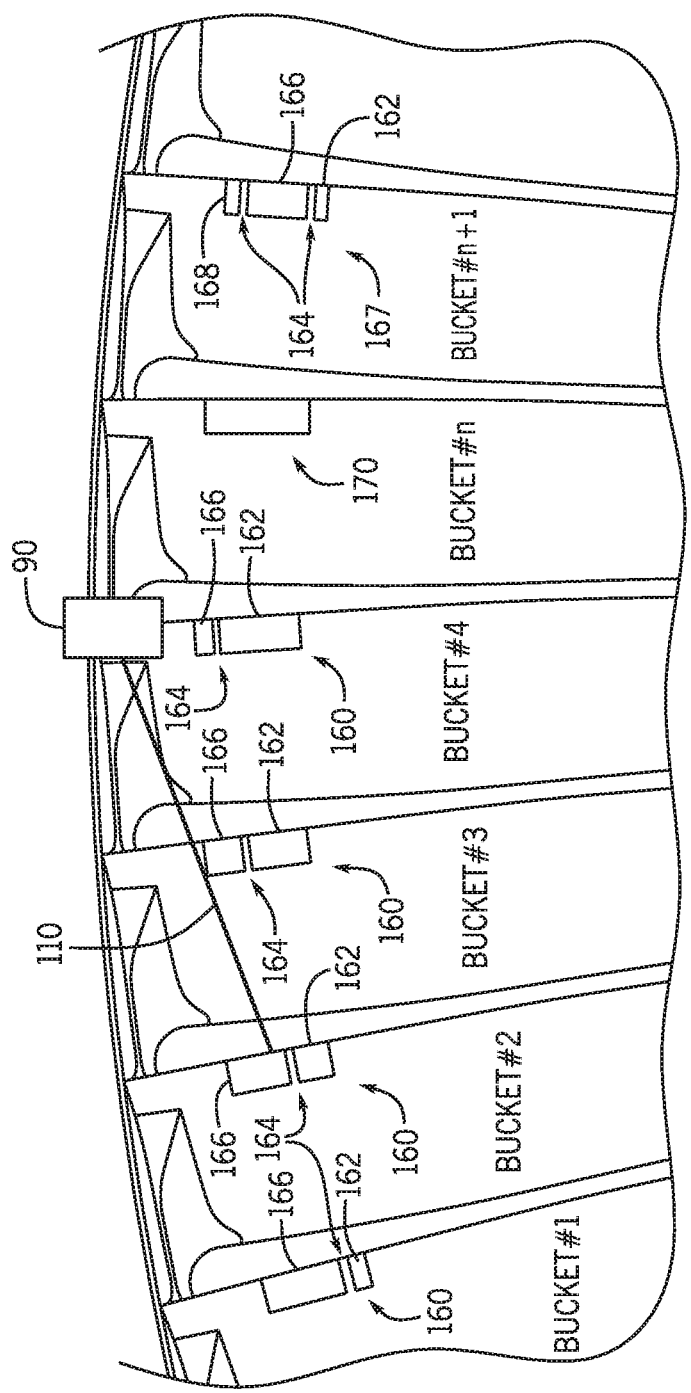
FIG. 6 is a detail front view of an embodiment of blades having various markings having discrete features suitable for determining certain blade properties and/or conditions.

Turning now to FIG. 6, the figure is a detail front view of an embodiment of blades 28 (also referred to as "buckets") with various markings 160 and 170 disposed on the edge of the blades 28. It is to be understood that while the markings 160, 170 are shown as being disposed on the blade's trailing edge, the markings 160, 170 may be disposed on a top of the blades, e.g., blade portion that is closest to stationary casing 102, or on other areas of the blade 28 (e.g., leading edge). In the depicted embodiment, the markings 160 include a first section 162, a "discrete" section or notch 164, and a second section 166. The discrete section 164 may be unpainted or otherwise unmarked, and thus separates the sections 162, 166 (or leading portions of the sections 162, 166) from each other.

The section 162 and 166 are shown as having different lengths as measured lengthwise along the blade 28. For example, in buckets 1 and 2 the section 162 is shorter than section 166, while in buckets 3 and 4 the section 162 is longer than the section 166. The markings 160 shown in buckets 1-4 may be used to identify individual buckets. For example, because the section 164 reflects light differently than sections 162, 166, each blade carrying the marking 160 may be uniquely marked. Further as impingement points shift, the shift may be detected as the shift may cross from a marked section (e.g., sections 162, 166) into a discrete or notched section 164, or vice versa from one blade 28 to another blade 28, or cross from a marked section into notched section 164 on the same blade 28. For example, an impingement point may be located on notch 164 of bucket 1 and then shift to notch 164 of bucket 2. Accordingly, locations of impingement points may be ascertained, leading to more accurate measures of conditions such as blade flutter, thermal changes, cracks (e.g., surface cracks), and so on.

The figure also illustrates a marking 167 having multiple discrete sections 164 dividing sections 162, 166, 168. Indeed, in certain embodiments, the markings may include multiple notches, for example, useful in further identifying a specific blade 28, useful in positioning and identifying sections prone to impingement point shifting, and so on. For example, shifts may be detected as impingement points move from a first notch 164 to second notch 164 in the same marking 167. A marking 170 is also shown, which has no discrete section or notch. In other words, marking 170 has only one painted section, such as a rectangular section shown. In certain embodiments, a stage 100 may only use one or more markings 160. In other embodiments, the one or more markings 160 may be combined with one or more markings 167, 170. Likewise, in certain embodiments, only one or more markings 167 may be used, while in other embodiments, the one or more markings 167 may be combined with one or more markings 160, 170.

The sections that are more reflective when compared to section 164, e.g., sections 162, 166, 168, and/or all of 170, may be painted and/or coated with a variety of coatings (e.g., light reflecting coatings, magnetic coatings, and/or thermal coatings), or otherwise marked (e.g., polished, left "rough", etc.). In certain embodiments the section 164 may be left unmarked, e.g. unpainted or uncoated. In other embodiments, the section 164 may be painted, coated or otherwise marked to reflect less light when compared with sections 162, 166, 168, and/or all of 170. Further, in certain embodiments, the section 164 may be a partial notch that does not completely separate sections 162, 166 from each other but rather leaves a portion of paint, coating, or other marking connecting sections 162, 166 (or 168), such as a trailing edge portion, connected to each other. In these embodiments the marking may look like a square shaped letter 'C' turned backwards. In embodiments where the sensors 90 may include magnetic sensors, the sections 162, 166 may be coated with coatings that may have a different magnetic field property (e.g., strength) when compared to the rest of the uncoated blade 28, such as coatings that include magnetic particles.

Figure 7:
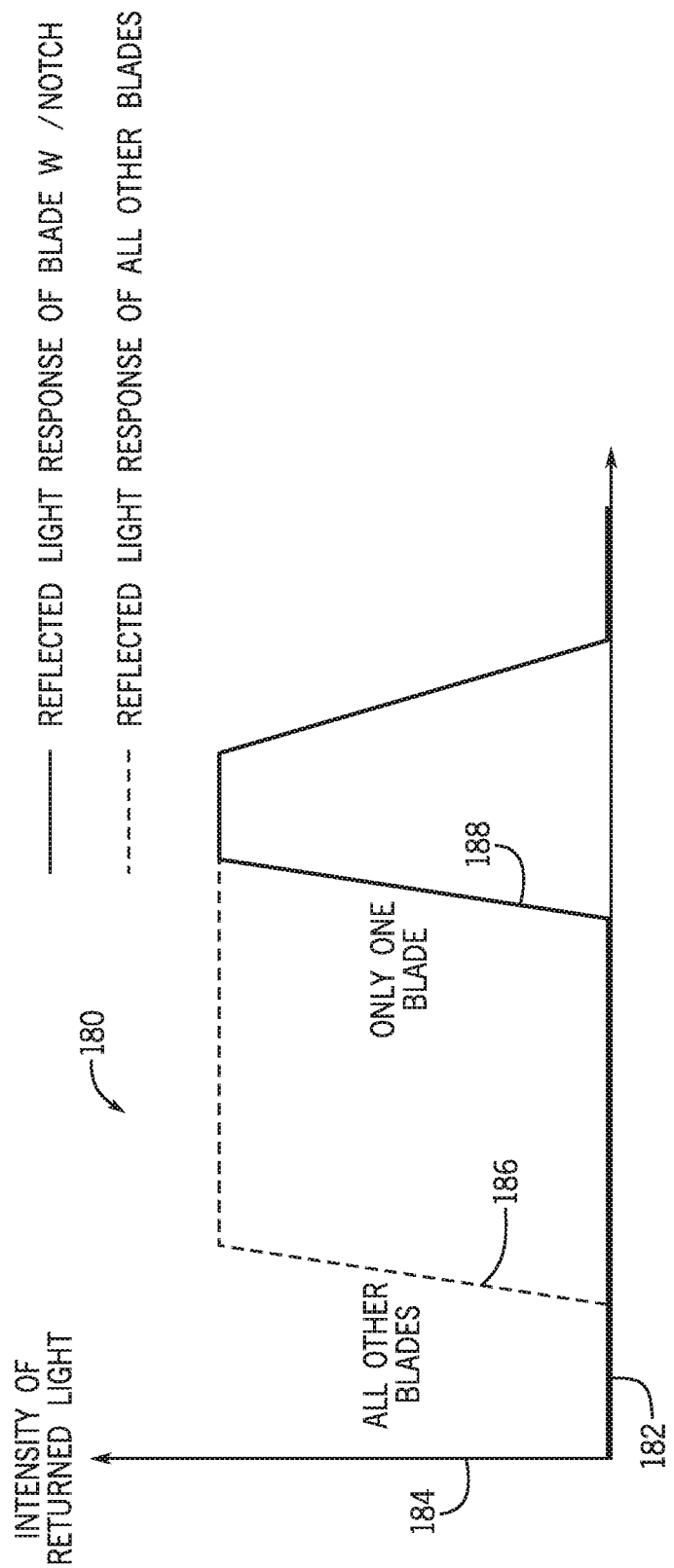
FIG. 7 is an embodiment of a graph having a time in an X axis and an intensity of returned light received via the sensor of FIG. 3 in a Y axis.

FIG. 7 illustrates and embodiment of a graph 180 depicting time in an X axis 182 versus an intensity of returned light from the beam 110 in a Y axis 184. More specifically, the graph 180 shows curves 186 that may be sensed from blades that may have unnotched markings, e.g., markings 170, versus blades that may have notched markings, e.g., markings 160, 167. As shown, the sensor 90 may receive light indicative of a reflective (or magnetic) surface earlier in time and for a longer time for unnotched marked blades when compared to notched marked blades, for example, because of increased reflectivity of the unnotched marks. Accordingly, a single notched marked blade may be easily identifiable as it rotates through one or more sensors 90 when compared to other blades 28.

Further, multiple sensors 90 may be each disposed to sense multiple locations, such as lengthwise locations on the blades 28. Accordingly, multiple notched markings (e.g. markings 160, 167) may also be identified, for example, by directing individual sensors 90 to observe unique locations 164 in each of the marked blades 28. In this manner, one or more blades 28 having the marking 160, 167 may be uniquely identified. In addition to uniquely identifying a blade 28 from other blades 28, the use of the section or notch 164 may also provide for other blade properties and characteristics, such as rotation speed, shifting of impingement point, blade material changes due to thermal changes, and so on.

Figure 8:
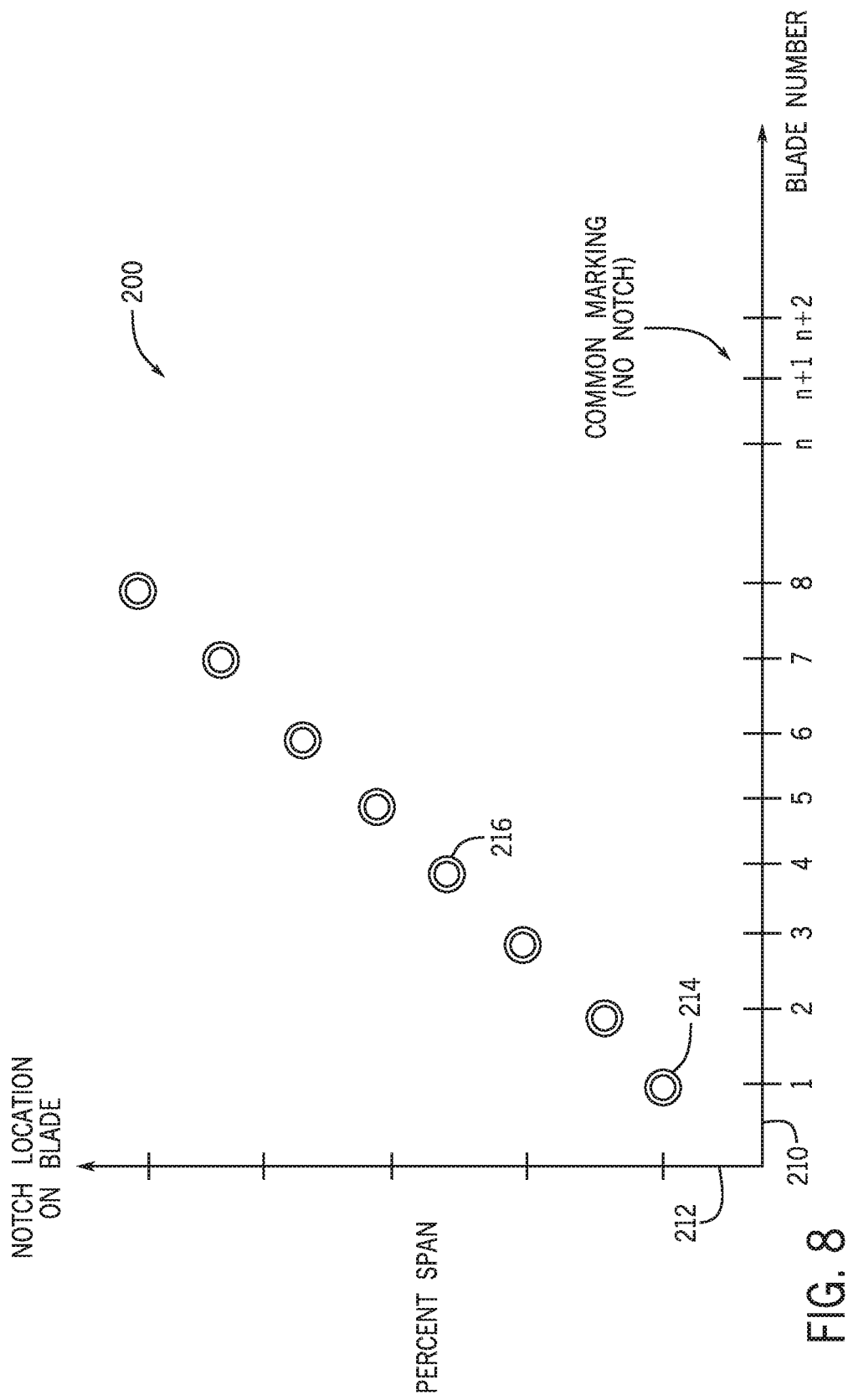
FIG. 8 is an embodiment of a graph having a blade number in an X axis and a location of a blade notch on a Y axis.

FIG. 8 illustrates and embodiment of a graph 200 depicting blade or bucket number in an axis 202 versus location of the notch 164 in a Y axis 204. For example, point 214 may refer to blade or bucket 1 having the notch 164 at a location lower than blade or bucket 4, which may be denoted by point 216. In the illustrated embodiment, bucket n+1 has the notchless marking 170. As the blades 28 rotate through one or more sensors 90, the one or more sensors 90 may derive the presence of each blade 28 as the light beam 110 from the one or more sensors 90 reflects back at different times during rotation of the stage 100. As mentioned earlier, in certain embodiments, each blade 28, such as bucket 1, 2, 3, . . . n, n+1, and so on, may be uniquely identified. Accordingly, rotative speed (e.g., revolutions per minute) for a blade 28 and/or any blade 28 may be calculated. In some embodiments, the locations may be calculated using a baseline bucket marked with marking 170. Likewise, as position shifting occurs, the position shifts may be detected via the notch 164, minimizing or eliminating errors, such as during blade flutter measurements.

Figure 9:
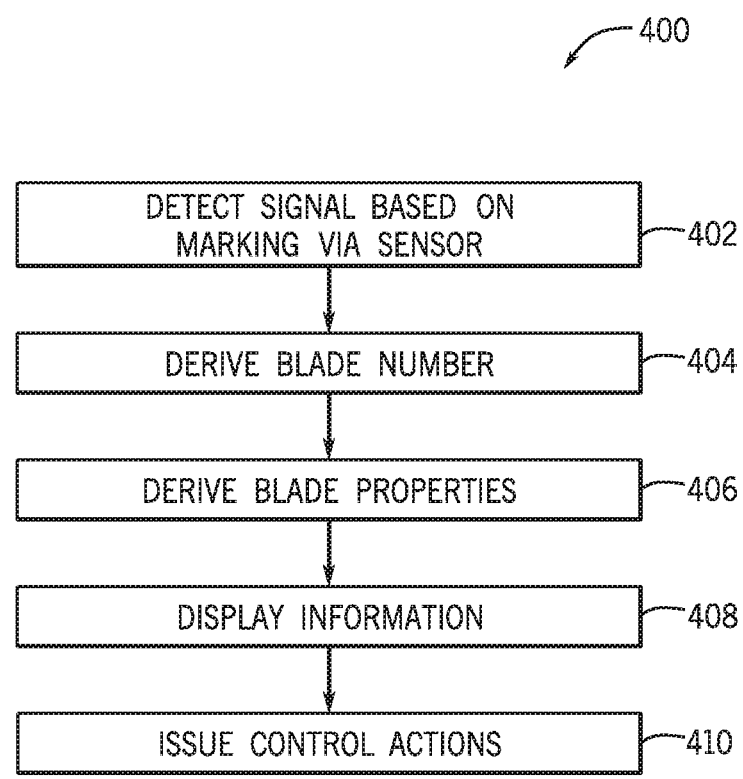
FIG. 9 is a flowchart of an embodiment of a process suitable for deriving certain information via the blade markings of FIG. 6.

FIG. 9 is a flowchart depicting an embodiment of a process 400 suitable, for example, to derive certain information via the markings 160, 167, 170, as well as to apply the derive information for display and/or control. The process 400 may be implemented as computer code or instructions executable by the processor 86 and stored in memory 88. In the depicted embodiment, the process 400 may first detect (block 402), for example in real time, a signal as a marked blade 28 passes through a sensing region of the sensor 90. In some embodiments, the process 400 may then derive (block 404) the blade number or other uniquely identifying information. As mentioned above, unique blades may be identified through the use of discrete features, e.g., notches 164, disposed at unique locations in one or more of the blades 28.

The process 400 may then derive (block 406) certain properties and/or characteristics for the sensed blade or blades 28. For example, blade speed in RPM may be derived, as well as actual location of impingement points for the light beam 110 may be determined. Blade flutter measurements, for example, may then be made more precise, and expansion/contraction of blade 28 material and/or stationary casing 102 may be determined. The process 400 may then display (block 408) information related to the markings 160, 167, and/or 170, including the properties and/or characteristics derived in block 406. For example, blade speed for each blade number may be displayed, blade flutter measures may be displayed, shifting of impingement points may be displayed, including location of new impingement points, and so on.

The process 400 may then issue (block 410) certain control actions, such as adjusting fuel flow, air flow, inlet guide van angles, and so on, based on the properties and/or characteristics derived in block 406. Because the derivations (e.g., derivations of block 406) may lead to more accurate measures, adjustments to blade 28 speed via fuel adjustments, air flow adjustments, inlet guide vane adjustments, and so on, may result in improved control of the gas turbine engine 12 and the power production system 10. By applying the markings 160, 167, and/or 170, the techniques described herein may provide for improved blade measurements via the sensors 90, which may include optical and/or magnetic sensors. It is also to be understood that while the techniques are described in view of gas turbine blades, other bladed turbine machinery, such as compressors, wind turbines, hydroturbines, expanders, and so on, may be used with the techniques described herein.

Technical effects include blade markings having discrete features, such as one or more notches. The notches may be used to uniquely identify a blade. The notches may additionally or alternatively be used to derive improve location information on beam impingement, magnetic pickup, or a combination thereof, as a position between a blade and a sensor shift, for example due to thermal changes. The information derived via the discretely marked blade may be used to improve accuracy in measurements such as more accurate blade flutter measurements, blade dynamic changes, individual blade speed, and so on.

This written description uses examples to disclose the present techniques, including the best mode, and also to enable any person skilled in the art to practice the techniques, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A blade monitoring system of a turbomachinery, comprising:
   a processor configured to:
      receive a sensor signal from a sensor configured to observe a first blade and a second blade of the turbomachinery, wherein the first blade and the second blade are disposed in a same rotating assembly of the turbomachinery;

derive a blade flutter measurement based on a first marking disposed on the first blade of the turbomachinery, wherein the first marking comprises a discrete feature having a notch on the first blade and wherein a second marking disposed on the second blade of the turbomachinery comprises a non-notched feature disposed on the second blade; and display the blade flutter measurement to an operator of the turbomachinery.

2. The blade monitoring system of claim 1, wherein the notch divides the first marking into two sections, each of the two sections having more light reflectivity when compared to the notch.

3. The blade monitoring system of claim 2, wherein the two sections comprise painted sections, coated sections, polished sections or a combination thereof.

4. The blade monitoring system of claim 1, wherein the first marking comprises a second discrete feature.

5. The blade monitoring system of claim 1, wherein the processor is configured to:

receive a second sensor signal from the sensor configured to observe the second blade of the turbomachinery;

derive a second measurement based on the second marking disposed on the second blade of the turbomachinery; and display the second measurement to the operator of the turbomachinery, wherein the non-notched feature is disposed at a different location on the second marking when compared to the discrete feature in the first marking.

6. The blade monitoring system of claim 5, wherein the different location comprises a different lengthwise location on the second blade when compared to the first blade.

7. The blade monitoring system of claim 1, wherein the blade flutter measurement comprises a unique identification measurement identifying the first blade from other blades in a stage of the turbomachinery.

8. The blade monitoring system of claim 1, wherein the turbomachinery comprises a gas turbine and wherein the first blade is disposed in a stage of the gas turbine.

9. A turbomachinery system, comprising:

a first blade configured to rotate during operations of the turbomachinery system;

a second blade configured to rotate during the operations of the turbomachinery system, wherein the first blade and the second blade are disposed in a same rotating assembly of the turbomachinery system;

a sensor configured to observe the first blade and the second blade of the turbomachinery system; and a blade monitoring system, comprising:

a processor configured to:

receive a sensor signal from the sensor;

derive a blade flutter measurement based on a first marking disposed on the first blade of the turbomachinery system, wherein the first marking comprises a discrete feature having a notch on the first blade and wherein a second marking disposed on the second blade of the turbomachinery system comprises a non-notched feature disposed on the second blade; and display the blade flutter measurement to an operator of the turbomachinery system.

10. The turbomachinery system of claim 9, wherein the notch divides the first marking into two sections, each of the two sections having more light reflectivity when compared to the notch.

11. The turbomachinery system of claim 10, wherein the two sections comprise painted sections, coated sections, polished sections or a combination thereof.

12. The turbomachinery system of claim 9, wherein the processor is configured to:

receive a second sensor signal from the sensor configured to observe the second blade of the turbomachinery system;

derive a second measurement based on the second marking disposed on the second blade of the turbomachinery system, wherein the second marking comprises the non-notched feature having a length different than the first marking; and display the second measurement to the operator of the turbomachinery system, wherein the non-notched feature is disposed at a different location on the second marking when compared to the discrete feature in the first marking, wherein the different location comprises a different lengthwise location on the second blade when compared to the first blade.

13. A method, comprising:

receiving, via a processor, a sensor signal from a sensor configured to observe a first blade of a turbomachinery and a second blade of the turbomachinery;

deriving, via the processor, a blade flutter measurement based on a first marking disposed on the first blade of the turbomachinery, wherein the first marking comprises a discrete feature having a notch on the first blade and wherein a second marking disposed on the second blade of the turbomachinery comprises a non-notched feature disposed on the second blade wherein the first blade and the second blade are disposed in a same rotating assembly of the turbomachinery; and displaying the blade flutter measurement to an operator of the turbomachinery, wherein the non-notched feature is disposed at a different location on the second marking when compared to the discrete feature in the first marking.

14. The method of claim 13, wherein the notch divides the first marking into two sections, each of the two sections having more light reflectivity when compared to the notch.

15. The method of claim 14, wherein the two sections comprise painted sections, coated sections, polished sections or a combination thereof.

16. The method of claim 13, comprising:

receiving a second sensor signal from the sensor configured to observe the second blade of the turbomachinery;

deriving a second measurement based on the second marking disposed on the second blade of the turbomachinery, wherein the second marking comprises the non-notched feature; and displaying the second measurement to the operator of the turbomachinery, wherein the non-notched feature is disposed at a different location on the second marking when compared to the discrete feature in the first marking, wherein the different location comprises a different lengthwise location on the second blade when compared to the first blade.

* * * * *